(12) United States Patent
Webermann et al.

(10) Patent No.: US 10,212,884 B2
(45) Date of Patent: Feb. 26, 2019

(54) CUTTER BAR DRIVE FOR A MULTI-SECTION HEADER FOR ATTACHMENT TO HARVESTERS

(71) Applicant: Carl Geringhoff GmbH & Co. KG, Ahlen (DE)

(72) Inventors: Dirk Webermann, Senden (DE); Stephan Schulze Selting, Enniger (DE); Michael Pokriefke, Hude (DE)

(73) Assignee: Carl Geringhoff GmbH & Co. KG, Ahlen (DE)

( * ) Notice: Subject to any disclaimer, the term of this patent is extended or adjusted under 35 U.S.C. 154(b) by 92 days.

(21) Appl. No.: 15/285,505

(22) Filed: Oct. 5, 2016

(65) Prior Publication Data

US 2017/0105344 A1    Apr. 20, 2017

(30) Foreign Application Priority Data

Oct. 5, 2015   (DE) .................. 10 2015 116 890

(51) Int. Cl.

| | |
|---|---|
| *A01D 41/14* | (2006.01) |
| *A01D 43/06* | (2006.01) |
| *A01D 45/02* | (2006.01) |
| *A01D 34/30* | (2006.01) |

(52) U.S. Cl.
CPC ........... *A01D 41/142* (2013.01); *A01D 34/30* (2013.01); *A01D 43/06* (2013.01); *A01D 45/021* (2013.01)

(58) Field of Classification Search
CPC ...... A01D 34/30; A01D 41/14; A01D 34/305; A01D 34/145; A01D 34/02; A01D 34/04; A01D 34/13; A01D 41/142; A01D 34/135; Y10T 74/2173

USPC ............................. 56/257, 296, 17.6; 74/595
See application file for complete search history.

(56) References Cited

U.S. PATENT DOCUMENTS

| | | | | |
|---|---|---|---|---|
| 4,067,179 | A * | 1/1978 | Schneider .............. | A01D 34/30 56/297 |
| 4,909,025 | A * | 3/1990 | Reissig ................ | A01D 34/305 56/257 |
| 5,497,605 | A | 3/1996 | Underwood et al. | |
| 7,520,118 | B1 * | 4/2009 | Priepke .................. | A01D 34/30 56/257 |

(Continued)

FOREIGN PATENT DOCUMENTS

| | | |
|---|---|---|
| DE | 87 02 363.6 | 7/1987 |
| DE | 195 24 039 | 1/1997 |

*Primary Examiner* — Arpad Fabian-Kovacs
(74) *Attorney, Agent, or Firm* — Gudrun E. Huckett (57) ABSTRACT

A header for stalk crop has a multi-part cutter bar with oscillatingly driven cutter bar parts. Cutter bar knives of the cutter bar interact with counter knives connected to header frame. A drive shaft ends in a first plane inside a gear housing arranged behind the cutter bar. An eccentric shaft supported in the gear housing carries a gear wheel arranged in a second plane above or below the first plane. The drive shaft drives the gear wheel through a bevel gear. First and second eccentric discs, arranged in third and fourth planes, respectively, are connected to the eccentric shaft; first and second eccentric levers are correlated therewith. First and second pivot levers are connected to the first and second eccentric levers and connected to stationarily supported pivot shafts. Crank arms connected to the pivot shafts, respectively, transmit their pivot movement to the cutter bar parts.

16 Claims, 4 Drawing Sheets

50 = hydraulic pump
52 = cooling circuit (56) References Cited

U.S. PATENT DOCUMENTS

| | | | | |
|---|---|---|---|---|
| 7,805,919 | B2* | 10/2010 | Priepke | A01D 41/142 56/257 |
| 8,011,272 | B1* | 9/2011 | Bich | A01D 34/305 56/299 |
| 9,532,502 | B2* | 1/2017 | Cook | A01D 34/30 |
| 9,668,407 | B2* | 6/2017 | Cook | A01D 34/02 |
| 2008/0148701 | A1* | 6/2008 | Priepke | A01D 34/145 56/17.6 |
| 2009/0145097 | A1* | 6/2009 | Priepke | A01D 34/30 56/257 |
| 2009/0145264 | A1* | 6/2009 | Priepke | A01D 34/30 74/84 R |
| 2011/0099964 | A1 | 5/2011 | Coers et al. | |
| 2014/0130472 | A1* | 5/2014 | Cook | A01D 34/30 56/16.4 R |
| 2014/0190139 | A1* | 7/2014 | Cook | A01D 34/145 56/10.1 |
| 2014/0215991 | A1* | 8/2014 | Brimeyer | A01D 34/30 56/14.7 |
| 2014/0345239 | A1* | 11/2014 | Cook | A01D 34/145 56/10.1 |
| 2015/0163994 | A1* | 6/2015 | Bich | A01D 34/14 56/299 |
| 2015/0305233 | A1* | 10/2015 | Surmann | A01D 34/135 56/10.1 |
| 2016/0066503 | A1* | 3/2016 | Cook | A01D 34/30 56/257 |
| 2017/0265383 | A1* | 9/2017 | Cook | A01D 34/02 |

\* cited by examiner

Fig. 1

50 = hydraulic pump
52 = cooling circuit

Fig. 2

60 = hydraulic motor
62 = electric motor

Fig. 3

50 = hydraulic pump
52 = cooling circuit
70 = hydraulic valve
72 = belt tension

Fig. 4

CUTTER BAR DRIVE FOR A MULTI-SECTION HEADER FOR ATTACHMENT TO HARVESTERS

BACKGROUND OF THE INVENTION

The present invention concerns a multi-section header for harvesting stalk crop, comprising a frame; a header bottom; a multi-part cutter bar that is arranged at the front side of the header wherein its cutter bar parts are arranged colinearly to each other and are driven oscillatingly transverse to the travel direction; cutter bar knives that are fastened to the cutter bar parts and interact with stationary or moving counter knives connected to the frame; a drive device for driving the multi-part cutter bar; and conveying members for transporting away the cut stalk crop.

US 2011/0099964 A1 discloses a header of the aforementioned kind. In this publication, bell cranks are disclosed as a drive means that are driven by a drive action so as to reciprocate the cutter bar parts. The bell cranks are arranged within a loop of the endless conveyor belt because the drive assembly does not fit between the cutter bar and the header bottom. The bell cranks must be supported within the frame of the header and with their ends facing the cutter bar must laterally project from the loop of the conveyor belt. Accordingly, the bell cranks are voluminous. Because of their size, they require a correspondingly voluminous and sturdy support in the frame. The pivots of the bell crank drive action are exposed to a significant dirt load during harvesting.

U.S. Pat. No. 5,497,605 discloses a drive of a multi-part cutter bar whose drive elements are however arranged above the header bottom and therefore interfere with the crop flow.

It is the object of the present invention to provide a lightweight drive that is as compact as possible for movement of the cutter bar parts. In particular, the drive device should be embodied to be so short that it can be arranged directly behind the cutter bar so as to not interfere with the crop flow of the cut crop behind the cutter bar and with the arrangement and configuration of the conveying members.

SUMMARY OF THE INVENTION

The object is solved according to the invention for a header of the aforementioned kind in that, behind the cutter bar parts, a gear housing is arranged and a drive shaft ends in a first plane inside the gear housing; the drive shaft drives by means of a bevel gear a gear wheel which is connected fixedly to an eccentric shaft that is stationarily supported in the gear housing, wherein the gear wheel is arranged in a second plane above or below the drive shaft plane; on the eccentric shaft in the gear housing, at least two eccentric discs are arranged in a third plane and a fourth plane above each other; and the eccentric discs each have correlated therewith in the plane of the respective correlated eccentric disc an eccentric lever that is connected to a pivot lever connected fixedly to a stationarily supported pivot shaft; and to the pivot shaft a crank arm is fixedly connected whose pivot movement is transmitted by a connecting element onto a cutter bar part.

The advantage of the arrangement according to the invention of the eccentric discs, of the drive shaft, and of the gear wheel arranged in various planes above each other is that the drive device contained within the gear housing is extremely short. Bell cranks that laterally engage about conveying members are not required. All drive components are located in an enclosed gear housing that provides good protection from dirt and moisture. All moved drive components within the gear housing can be supplied by one oil lubrication so that servicing requirements are reduced and a long service life of the components will result. The oil lubrication can also serve for cooling the gear bearings and toothings. The moments of force occurring during harvesting within the gear housing can be absorbed within the gear housing. The drive shaft can be guided comfortably from the side or from the rear into the gear housing.

In one arrangement in which at least the drive shaft, the bevel gear, the eccentric shaft, and the eccentric discs are arranged in the interior of the gear housing, a compact and protected configuration of the drive device results. In addition, also the eccentric levers, the pivot levers and the pivot shafts can be arranged within the interior of the gear housing. In this way, a fast and simplified assembly is provided and all components arranged within the gear housing are well protected against dirt and damage. Separate bearings, holding devices, and covers for these components are unnecessary.

According to one embodiment of the invention, the pivot shafts are arranged father forwardly in the gear housing than the eccentric shaft. Since the eccentric shaft extends in vertical direction within the gear housing across at least four different planes, while the pivot shafts in comparison thereto only extend across the planes of the eccentric levers and the plane of the input shaft arranged underneath, the gear housing can be designed more flat toward the cutter bar. Accordingly, the threshold from cutter bar to the header bottom can be kept low.

According to one embodiment of the invention, the gear housing cover of the gear housing comprises a slanted surface in its front area that is facing the cutter bar parts. The slanted surface simplifies transport of the cut crop from the cutter bar to the header bottom from where the crop is then transported away by the conveying members.

According to one embodiment of the invention, the eccentric levers extend parallel, or at least approximately parallel, to the longitudinal axis of the cutter bar parts. Due to the parallel or at least approximately parallel position of the eccentric levers relative to the longitudinal axis of the cutter bar parts, a well controllable force path of the moments of force occurring during operation of the header results. In case of a drive shaft which extends from the side into the gear housing, the moments of force of the eccentric levers extend also parallel thereto. The gear housing remains substantially free of torsion forces and can therefore be designed to be correspondingly more lightweight and less expensive.

According to one embodiment of the invention, the eccentric discs do not have an angle of rotation displacement of 180° to each other. Preferably, the eccentric discs have an angle of rotation displacement of 90°/270°. In case of an angle of rotation displacement of 180°, the cutter bar parts upon rotation of the eccentric shaft would meet each other at their inner end faces at dead center and then move away from each other again. Accordingly, the central area between the two cutter bar parts would remain unmowed and a narrow strip of crop would remain standing without being mowed, causing a corresponding loss of crop. In order to prevent this or to significantly reduce the loss, a partial overlap of the travel paths of the cutter bar parts relative to each other results when an angle of rotation displacement of 180° is avoided so that the unmowed still standing area of the crop is at least significantly reduced or entirely avoided.

According to one embodiment of the invention, the drive shaft that extends into the gear housing and/or the output shaft is oriented transverse to the travel direction. The term "transverse" to the travel direction is not to be understood in this context such that the drive shaft and/or the output shaft must extend precisely transverse to the travel direction but they can also be extending mainly transverse in relation to a longitudinal orientation. By a position of the drive shaft and/or the output shaft which is arranged precisely parallel or approximately parallel to the cutter bar, a drive train of a short and flat configuration is enabled.

According to one embodiment of the invention, the drive shaft is driven by a hydraulic or electric motor which is arranged laterally on the header. For the drive action of the cutter bar, it is sufficient to extend a hydraulic or electric line to the hydraulic or electric motor arranged laterally on the header and to transmit the rotary movement of the hydraulic or electric motor by a gear to the drive shaft which extends from the hydraulic or electric motor to the gear housing of the cutter bar drive. The hydraulic or electric line can be produced easily and inexpensively. For the cutter bar drive it is sufficient to guide a drive shaft from only one side of the header to the gear housing so that this solution is also realizable in an inexpensive way.

According to one embodiment of the invention, the drive train is extending from a mechanical force source at the back wall of the header to the (first) drive shaft by means of a shaft of a deflection roller of a belt conveyor which is circulating transverse to the travel direction of the header or by means of a separate (second) drive shaft, wherein the rotary movement output at the leading end of the deflection roller or of the separate (second) drive shaft is transmitted by a bevel gear arranged thereat to the (first) drive shaft extending into the gear housing. As a mechanical force source on the back wall of the header, a hydraulic motor or electric motor can be provided, for example, or a mechanical drive force is transmitted from a power take-off shaft of the harvester to which the header is connected. The cutter bar drive according to the invention can be used, for example, in draper headers in which endless circulating belt conveyors are used as conveying members for transporting the cut crop. The outer belt conveyors of a draper header circulate transverse to the forward travel direction of the header so that the shaft of a deflection roller of these belt conveyors with its axis of rotation is oriented so as to point from the cutter bar to the back wall of the header. Particularly the deflection roller, arranged on the side facing the center of the header, of the transversely conveying belt conveyor that is last in the conveying direction and upstream of the center belt conveyor conveying in the longitudinal direction of the header can be used advantageously as a through drive of the drive force from the back side of the header to the drive shaft because from there only short distances from the bevel gear to the gear housing exist.

The shaft of the deflection roller itself can be used as a force transmitting means or the shaft of the deflection roller is designed as a hollow shaft through which a separate (second) drive shaft is extended. The separate (second) drive shaft can also be extending adjacent to a deflection roller and independent of it. This has the advantage that the working rotary speed of the deflection roller and of the separate drive shaft can be controlled separately. For example, in this solution it is possible to continue to run the belt conveyor, while the cutter drive is switched off or the cutter drive can be started while the belt conveyor is still standing in order to keep the starting torques low. The separate drive shaft forms a good support of the deflection roller against buckling when the belts of the belt conveyor are tensioned.

Different speeds of the deflection roller and of the separate drive shaft can be adjusted as desired, for example, by a speed modulation gearbox.

According to one embodiment of the invention, a hydraulic pump is in drive connection with the drive shaft or the eccentric shaft and pumps the oil contained in the gear housing into a cooling circuit. The hydraulic pump can be integrated inexpensively into the gear housing. Due to the cooling circuit, the operating temperature of the oil contained in the gear housing can be kept at a low range. Oil cooling indirectly also keeps low the operating temperatures of the moveable drive components arranged in the gear housing. The cooling circuit can be guided, for example, through pipes of the frame or other components of the header so as to avoid having to mount additional coolers in the header. A separate cooling circuit is advantageous because cooling ribs on the gear housing easily clog with dirt or can become damaged upon contact with the ground or obstacles.

According to one embodiment of the invention, a hydraulic valve is connected to the cooling circuit or the hydraulic pump with which the belt tension of a belt conveyor can be switched. The hydraulic power of the hydraulic pump can be utilized in order to control by a valve the belt tension of a belt conveyor. For example, by means of a hydraulic belt tensioning device, starting of the belt conveyor can be delayed in order to keep the starting torques upon starting of the header as low as possible.

According to one embodiment of the invention, the gear housing comprises a horizontally extending division between the gear housing bottom and the gear housing cover. The gear housing bottom can be shaped such that the input shaft, the eccentric shaft, and the pivot shafts with their respective bearings can be easily inserted from above. When the gear housing cover receives the bearings for the eccentric shaft and the pivot shafts, a simplified assembly of the drive components arranged within the gear housing is possible.

According to one embodiment of the invention, the drive shaft is in drive connection with an output shaft which drives at least one conveying member of the header. The gear housing is utilized in this way in order to utilize the drive power, available by means of the drive shaft in the front area of the header, for other members of the header, in particular a conveying member. For example, it is possible to drive by the output shaft by means of a bevel gear a deflection roller of a transversely conveying belt conveyor. The output shaft can be directly connected to the drive shaft or the drive force is transmitted by means of an intermediate drive means, for example, a gear wheel, to the output shaft.

According to one embodiment of the invention, a controlled multi-disc clutch is arranged in the drive train to the drive shaft. The controlled multi-disc clutch enables slow starting of the drive. The resulting moments of force can be kept lower in this way. The header can therefore be attached also to harvesters whose drive is designed only for lower starting torques. Also, the shafts and gears in the header can be designed for lower starting torques which saves on weight and costs.

It is expressly noted that the afore described embodiments of the invention separately but also in any combination with each other can be combined with the subject matter of the independent claim, inasmuch as no technically compelling obstacles stand in the way.

Further modifications and embodiments of the invention can be taken from the following description and the drawings.

BRIEF DESCRIPTION OF THE DRAWINGS

The invention will now be explained with the aid of embodiments in more detail.

DESCRIPTION OF PREFERRED EMBODIMENTS

Figure 1:
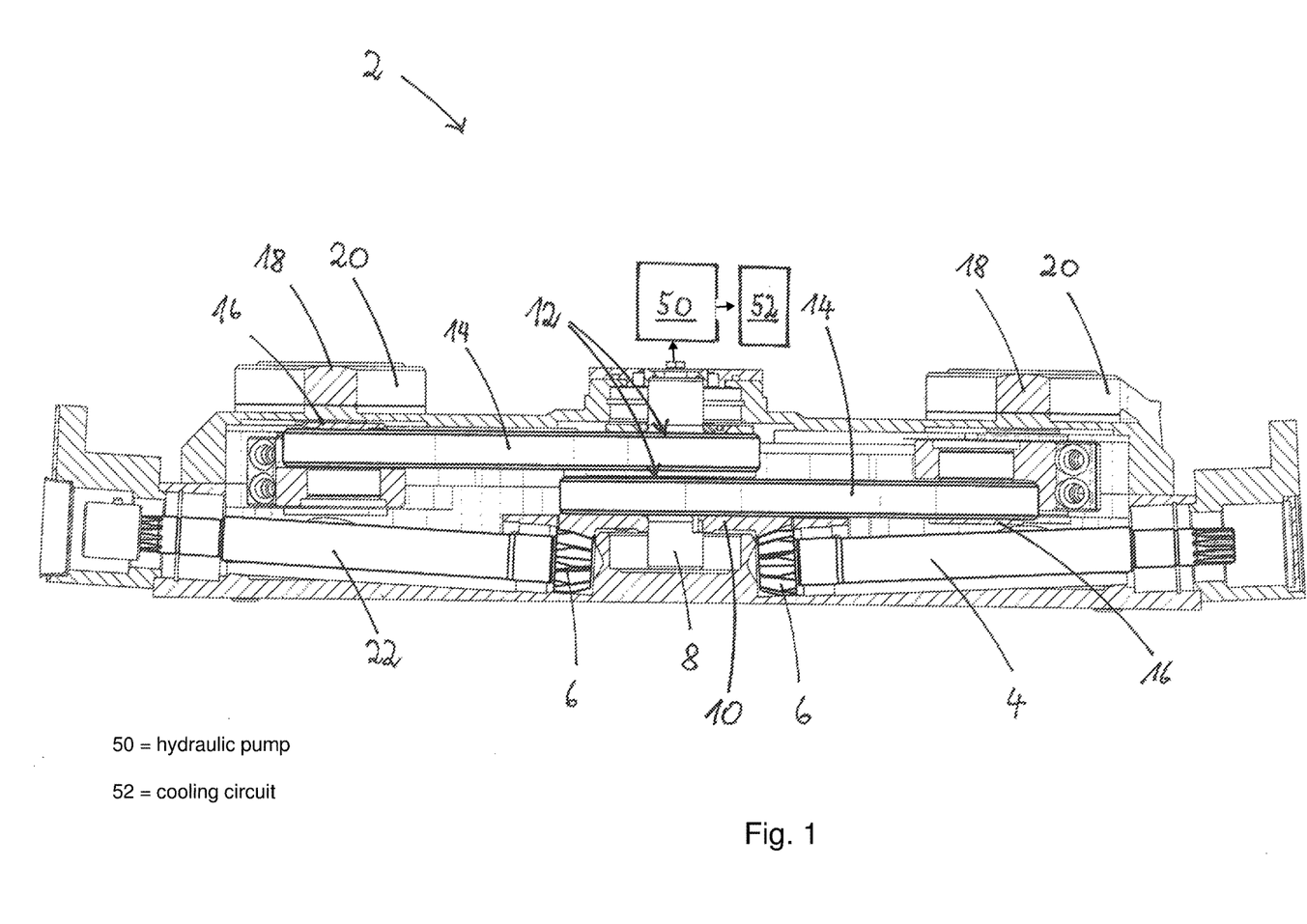
FIG. 1 shows a section illustration of a gear housing.

In FIG. 1 a gear housing 2 is shown in a section view. In the lowermost plane of the gear housing 2, the drive shaft 4 extends into the gear housing 2. By means of a bevel gear 6 the rotary speed of the drive shaft 4 is transmitted to the gear wheel 10 that is fixedly arranged on the eccentric shaft 8 in a second plane above the drive shaft 4. In the embodiment, the drive shaft 4 is arranged approximately parallel to the cutter bar 34. In transverse direction, the drive shaft 4 is angled relative to the cutter bar 34 by some angular degrees in the horizontal and vertical planes. The same holds true for the output shaft 22. By means of the gear wheel 10, the eccentric shaft 8 is rotated also.

On the eccentric shaft 8 which is substantially installed in vertical direction into the gear housing 2, two eccentric discs 12, which are hidden by the eccentric levers 14 in the section view of FIG. 1, are arranged in the third and fourth planes. The eccentric levers 14 are joined for articulation to pivot levers 16 which in turn are connected fixedly to a pivot shaft 18. The pivot shafts 18 project from the gear housing 2 upwardly and transmit their rotary movement to crank arms 20 which are fixedly attached to the pivot shafts 18. The pivot movements of the crank arms 20 are transmitted by connecting elements, not illustrated in detail in the drawing, to a respective cutter bar part.

The rotary movement of the drive shaft 4 is transmitted by gear wheel 10 to the output shaft 22 which is arranged on the opposite side of the gear housing 2 relative to the eccentric shaft 8. The transmission of the rotary movement of the drive shaft 4 to the output shaft 22 represents a through drive of the drive force.

Figure 2:
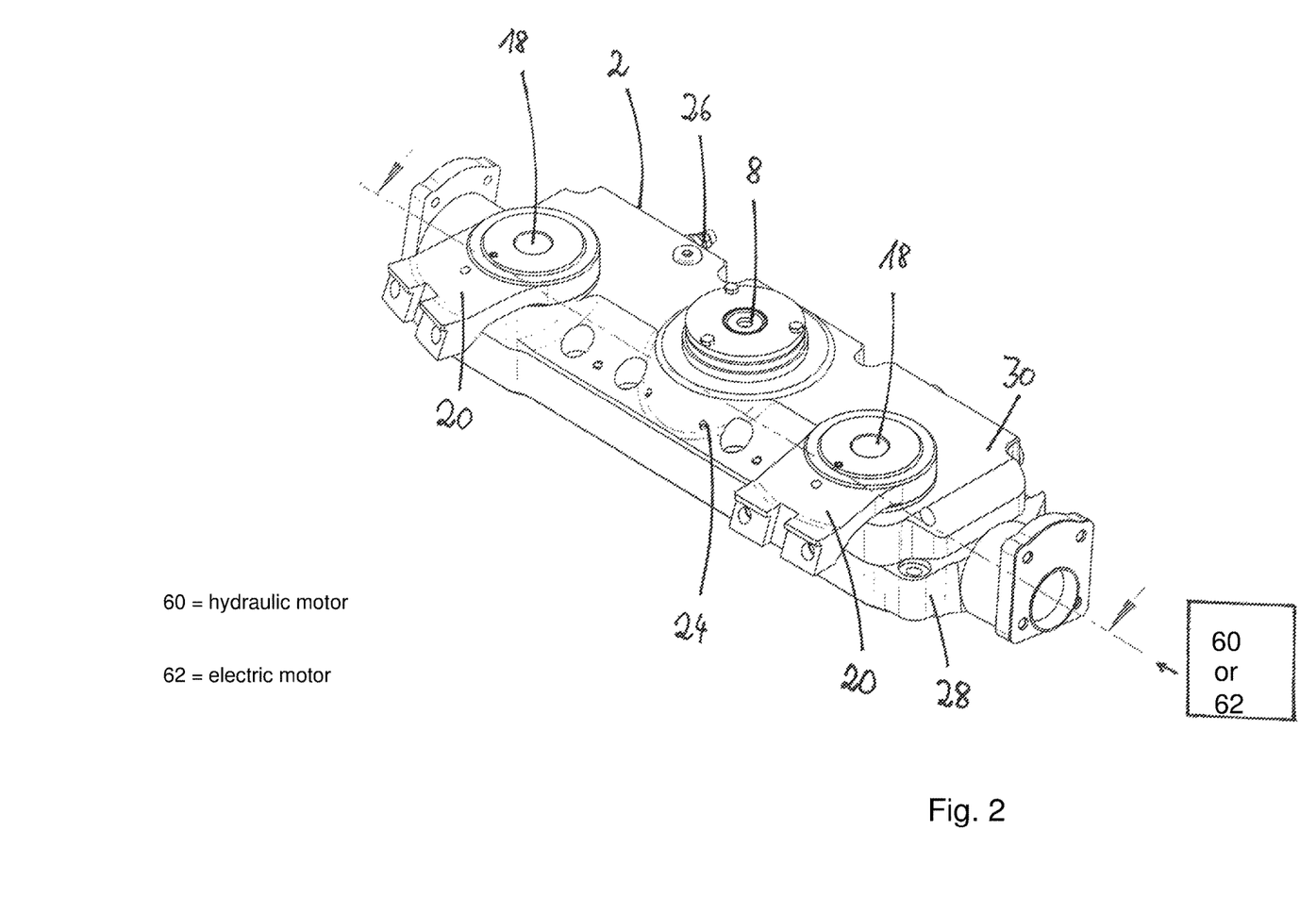
FIG. 2 is a perspective view of a gear housing from the front.

In FIG. 2, the gear housing 2 is shown in a closed state in a perspective view from above. This view indicates the drive shaft 4 and the output shaft 22. Also, the two crank arms 20 which are oriented forwardly toward the cutter bar can be seen well; in harvesting operation they carry out an oscillating movement that is transmitted to the cutter bar parts. Also, the cover of the eccentric shaft 8 can be seen well. The pivot shafts 18 to which the crank arms 20 are fastened are located forwardly in the gear housing 2 in comparison to the eccentric shaft 8. When in this specification reference is being had to front and rear, front always means the direction in which, for harvesting, the header is moved into the crop to be harvested and rear the direction in which the harvester is positioned to which the header is attached.

FIG. 2 shows schematically a hydraulic motor 60 or electric motor 62 as a drive for the drive shaft. In FIG. 2 also the slanted surface 24 can be seen well which is designed to descend to the front. Moreover, FIG. 2 also shows the horizontally extending division between the gear housing bottom 28 and the gear housing cover 30. At the rear of the gear housing 2 there is also an oil connector 26 through which by means of a hydraulic pump 50, only schematically illustrated in FIGS. 1 and 3 and located in the interior of the gear housing 2, oil can be dispensed into a cooling circuit 52 (FIGS. 1 and 3) and/or pressure oil can be dispensed for actuation of a hydraulic valve 70 (FIG. 3), also illustrated only schematically in the drawing. The hydraulic valve 70 is connected to the cooling circuit 52 or the hydraulic pump 50; the belt tension 72 of the belt conveyor 32 can be switched by it.

Figure 3:
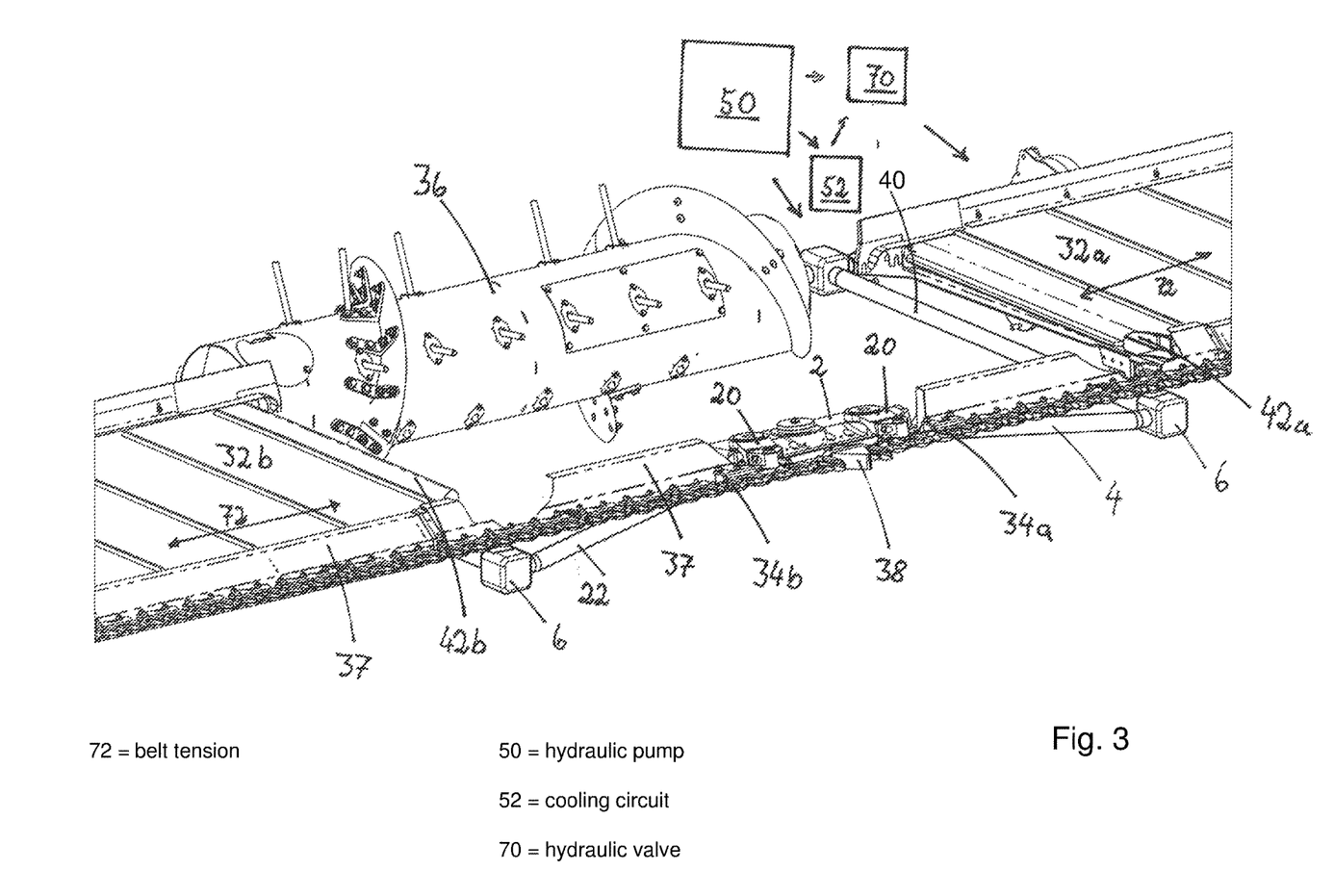
FIG. 3 is a view of a drive train in which the drive force is guided from the rear of the header to the gear housing by means of a separate drive shaft.

FIG. 3 shows a perspective view from the front of the conveying members of a header wherein parts of the header are not shown in this view. The header bottom is formed in this embodiment by the top side of the conveying members in the form of belt conveyors 32a, 32b wherein the central belt conveyor which conveys the crop to the rear is not shown. The two illustrated belt conveyors 32a, 32b each convey the crop placed on them transversely to the travel direction onto the central belt conveyor. In the perspective view from the front illustrated in FIG. 3, it can be seen that in the embodiment the drive shaft 4 and the output shaft 22 in the vertical plane are not extending precisely parallel to the cutter bar 34 but drop downwardly by a few angular degrees toward the sides. However, they have in approximation the same orientation as the cutter bar 34.

Between the cutter bar 34 and the top side of the belt conveyors 32a, 32b, there is a step 37 across which the cut crop must glide after the cut. In the view of FIG. 3, it can be seen that the height of the gear housing 2, despite the four different planes in its interior, is still more flat than the step 37 that must be surmounted in the area of the lateral belt conveyors 32a, 32b The gear housing 2 however is also so short that, behind it, a belt conveyor conveying to the rear can be easily arranged which conveys the crop into the effective range of a rotatingly driven intake roller 36 as an additional conveying member for the crop.

The cutter bar 34 is divided in the embodiment into two cutter bar parts 34a, 34b whose separation line is approximately in the area of the haulm divider 38. Both cutter bar parts 34a, 34b are driven by the drive device in the gear housing 2 by means of the drive shaft 4. The (first) drive shaft 4 is connected by a bevel gear 60a to the separate (second) drive shaft 40 with which the drive force is transmitted from the rear of the header to the front. The separate drive shaft 40 is positioned approximately parallel to the deflection roller 42a of the neighboring belt conveyor 32.

The output shaft 22 ends in the embodiment illustrated in FIG. 3 at a bevel gear 60b by means of which the deflection roller 42b of the left conveyor 32b is driven. In this way, the left belt conveyor 32b is driven from the rear of the header by the drive device for the cutter drive.

Figure 4:
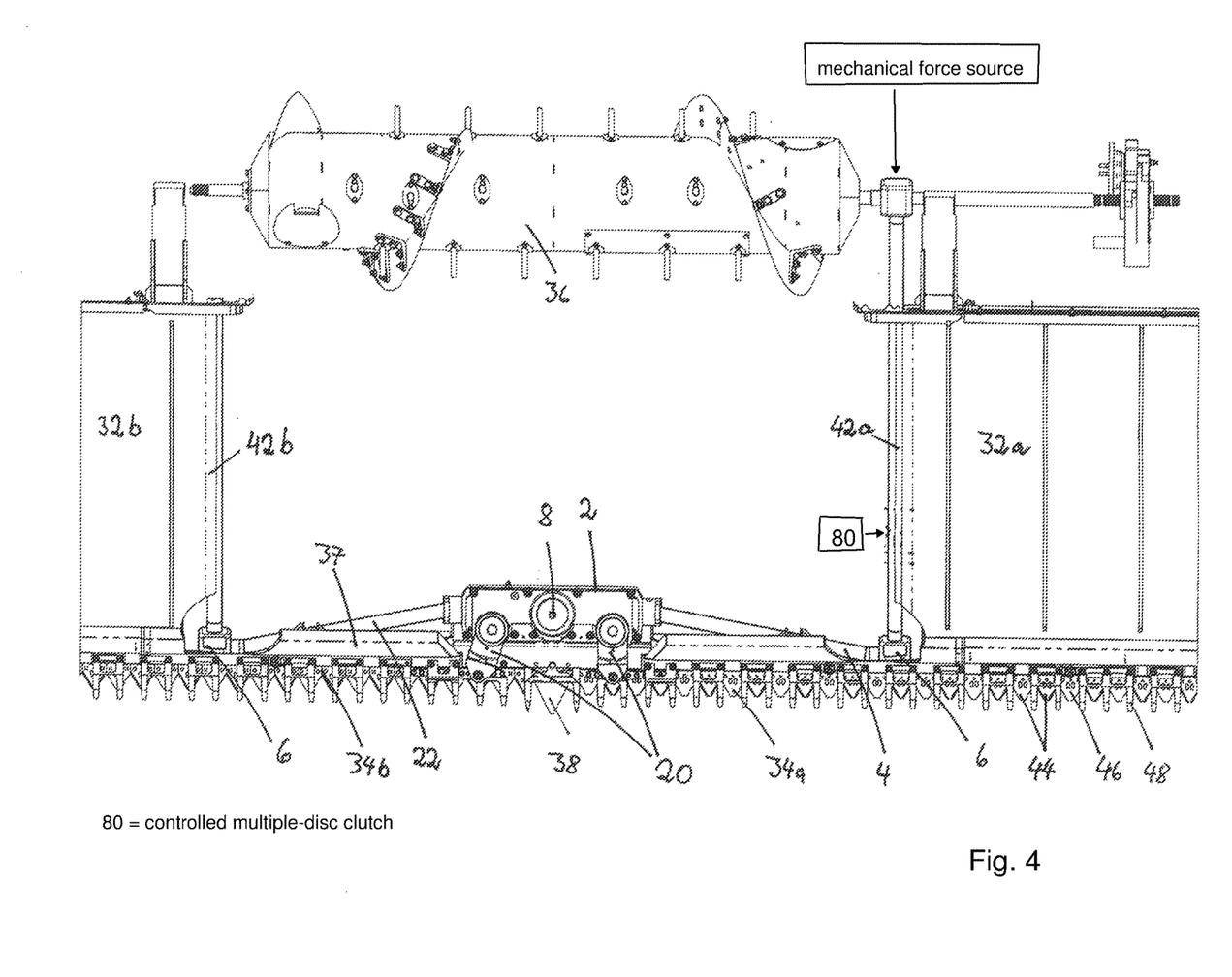
FIG. 4 is a drive train in which a separate drive shaft is embodied by a deflection roller, embodied as a hollow shaft, of a transversely conveying belt conveyor.

FIG. 4 shows a view from above of a drive with schematically indicated mechanical drive source. A separate drive shaft 40 is formed by a deflection roller 42a which is designed as a hollow shaft of the transversely conveying belt conveyor 32a. The drive train includes a controlled multiple-disc clutch 80, only schematically shown. As in the embodiment illustrated in FIG. 3, here also the deflection roller 42b is driven from the rear of the header by the drive device for the cutter drive. The view from above shows that the drive shaft 4 and the output shaft 22 in the horizontal plane are not precisely parallel to the cutter bar 34 but, relative to the side, are oriented toward the front by a few angular degrees. Essentially, the drive shaft 4 and the output shaft 22 are however extending in the horizontal plane in approximation parallel to the cutter bar 34, approximately in the space of an imaginary lateral extension of the gear housing 2, so that a short and flat configuration of the drive is possible. The bevel gears 60a, 60b adjoining in lateral direction the drive shaft 4 and the output shaft 22 are arranged in the area behind the cutter bar 34.

In the view from above in FIG. 4, the cutter bar knives 44 which are fastened to the cutter bar parts 34a, 34b can be seen; upon transverse movement of the cutter bar parts 34a, 34b, the cutter bar knives 44 carry out a scissor-like cutting movement in interaction with the counter knives 46 which can be embodied on the mowing guards 48 or as separate knives. In the view from above it can also be seen well that the drive device according to the invention for the cutter bar is extremely short and provides sufficient free space for a belt conveyor or a rigid header bottom adjoining downstream in the conveying direction the cutter bar and the step for transporting away the cut crop.

The invention is not limited to the afore described embodiments. A person of skill in the art will have no problems with modifying the embodiments in a way appearing suitable to him in order to adapt them to a concrete application situation.

The specification incorporates by reference the entire disclosure of German priority document 10 2015 116 890.1 having a filing date of Oct. 5, 2015.

While specific embodiments of the invention have been shown and described in detail to illustrate the inventive principles, it will be understood that the invention may be embodied otherwise without departing from such principles.

What is claimed is:

1. A header for harvesting stalk crop, the header comprising:
   a frame;
   a header bottom;
   a multi-part cutter bar arranged at a front side of the frame relative to a travel direction of the header during harvesting, wherein the cutter bar comprises at least a first cutter bar part and a second cutter bar part arranged colinearly to each other and driven oscillatingly transverse to the travel direction;
   cutter bar knives fastened to the first and second cutter bar parts;
   stationary or moving counter knives connected to the frame and interact with the cutter bar knives;
   a drive device operatively connected to the multi-part cutter bar;
   conveying members configured to transport away cut stalk crop;
   a gear housing arranged behind the first and second cutter bar parts;
   the drive device comprising:
      a first drive shaft ending in a first plane inside the gear housing;
      an eccentric shaft that is stationarily supported in the gear housing;
      a gear wheel fixedly connected to the eccentric shaft and arranged in a second plane above or below the first plane;
      a bevel gear operatively connected to the gear wheel, wherein the first drive shaft is drivingly connected to the bevel gear and drives through the bevel gear the gear wheel;
      a first eccentric disc connected to the eccentric shaft in the gear housing and arranged in a third plane;
      a second eccentric disc connected to the eccentric shaft in the gear housing and arranged in a fourth plane above the third plane, wherein the first and second eccentric discs are mounted together on the eccentric shaft on top of each other;
      a first eccentric lever correlated with the first eccentric disc and arranged in the third plane;
      a second eccentric lever correlated with the second eccentric disc and arranged in the fourth plane;
      a first pivot lever connected to the first eccentric lever and fixedly connected to a first stationarily supported pivot shaft;
      a second pivot lever connected to the second eccentric lever and fixedly connected to a second stationarily supported pivot shaft;
      a first crank arm fixedly connected to the first pivot shaft, wherein a pivot movement of the first crank arm is transmitted by a connecting element to the first cutter bar part;
      a second crank arm fixedly connected to the second pivot shaft, wherein a pivot movement of the second crank arm is transmitted by a connecting element to the second cutter bar part.

2. The header according to claim 1, wherein the first and second pivot shafts are arranged farther to a front end of the gear housing than the eccentric shaft.

3. The header according to claim 1, wherein the gear housing comprises a gear housing cover that has a slanted surface in a front area facing the first and second cutter bar parts.

4. The header according to claim 1, wherein the first and second eccentric levers extend parallel, or at least approximately parallel, to a longitudinal axis of the first and second cutter bar parts.

5. The header according to claim 1, wherein the first and second eccentric discs do not have a rotation angle displacement of 180° relative to each other.

6. The header according to claim 1, wherein the first drive shaft is oriented transversely to the travel direction.

7. The header according to claim 1, wherein the drive device further comprises an output shaft operatively connected to the first drive shaft and extending out of the gear housing, wherein the output shaft is oriented transversely to the travel direction.

8. The header according to claim 7, wherein the first drive shaft is oriented transversely to the travel direction.

9. The header according to claim 1, further comprising a motor embodied as a hydraulic motor or an electric motor, wherein the first drive shaft is driven by the motor.

10. The header according to claim 1, further comprising a mechanical force source provided at a back wall of the header, wherein the conveying members include a belt conveyor circulating transversely to the travel direction of the header, wherein a drive train from the mechanical force source comprises a shaft of a deflection roller of the belt conveyor, wherein a rotary movement generated at a front end of the deflection roller is transmitted by a bevel gear arranged at the front end of the deflection roller to the first drive shaft.

11. The header according to claim 1, further comprising a mechanical force source provided at a back wall of the header, wherein a drive train from the mechanical force source comprises a second drive shaft, wherein a rotary movement generated at a front end of the second drive shaft is transmitted by a bevel gear arranged at the front end of the second drive shaft to the first drive shaft.

12. The header according to claim 1, further comprising a hydraulic pump that is in drive connection with the first drive shaft or the eccentric shaft, wherein the hydraulic pump pumps oil contained in the gear housing into a cooling circuit.

13. The header according to claim 12, further comprising a hydraulic valve, wherein the conveying members include a belt conveyor, wherein the hydraulic valve is configured to switch a belt tension of the belt conveyor, wherein the hydraulic valve is connected to the cooling circuit or to the hydraulic pump.

14. The header according to claim 1, wherein the gear housing is horizontally divided to form a gear housing bottom and a gear housing cover.

15. The header according to claim 1, wherein the first drive shaft is in drive connection with an output shaft that drives at least one of the conveying members of the header.

16. The header according to claim 1, further comprising a controlled multiple-disc clutch that is arranged in a drive train to the first drive shaft.

* * * * *